Patented Feb. 5, 1935

1,990,330

UNITED STATES PATENT OFFICE 1,990,330

LIGHT COLORED GUM FOR FABRIC PRINTING

Philip Kaplan, Brooklyn, N. Y., assignor to Richards Chemical Works, Inc., Jersey City, N. J., a corporation of New Jersey No Drawing. Application June 26, 1931,
Serial No. 547,193

1 Claim. (Cl. 87—2)

This invention has to do with the manufacture and/or preparation of gums for printing on fabrics, notably silk, in which work the gum is employed as a carrier or base for the dye or pigment which actually does the dyeing or so-called printing. The gum being washed out leaves the dye in the design in which the gum and pigment were originally applied.

The particular objects of this invention are to produce a light colored gum for this purpose.

The gums referred to are notably Shiraz and Karaya, although it must be understood that similar gums may be employed.

In the ordinary methods of preparing these gums the resultant gum product is somewhat dark, due to the extraction of coloring materials dissolved out of the impurities contained in the gum, which impurities probably emanate from foreign matter such as bark, seeds or even dirt, which is always found adhering to or actually contained within the gum.

In the preparation of the gum, one of the first steps is to cook the gum and I believe and from observation am convinced that the darkening takes place as a result of the cooking.

To overcome the darkening of the gum by the foreign matter, I add to the water in which the gum is cooked an acid medium which will prevent the extraction of the coloring matter from the vegetable foreign matter. In other words, I cook the gum in an acid medium, notably water, wherein is contained small amounts of such acids as phosphoric, sulphuric or other mineral acids or in the presence of strong organic acids such as formic and acetic acids.

The proportions that I have found most satisfactory are approximately as follows: Ten to fifteen parts of gum to one hundred parts of water, the proportion of acid used ranging from about one to two percent of the entire bulk. Of course care must be taken to cook these materials in acid proof containers so that metallic discoloration will not take place and also that the pressure and temperature must not exceed atmospheric conditions, in order to obtain the viscosity.

After the gum is cooked the reduced gum now in a somewhat liquid state is stored for future refining and processing.

To prepare the use the stock material is passed through a centrifuge machine to eliminate the coarser and heavier suspended material and impurities and thereafter at least a portion of the acid is neutralized with such neutralizing agents as tri-sodium phosphate or alkalis. It is my intention, however, to maintain a small percentage of acid.

I prefer to use a tri-sodium phosphate as a neutralizing agent because by its use I accomplish a double purpose. In addition to neutralizing some of the acid I also precipitate other impurities, such as iron, lime and magnesium, as insoluble phosphate compounds, in which form they may be filtered off, together with the finer suspended material and impurities by the aid of a suitable filtering medium such as infusorial earth and by the use of a filter press.

I may, however, precipitate these impurities with organic salts such as sodium tartrate or sodium oxalate the iron, magnesium and lime salts of which are also insoluble and therefore may be filtered out.

I may of course use a combination of tri-sodium phosphate, sodium tartrate and sodium oxalate, if desired. The operation of removing the impurities should be performed while the gum is in a considerable liquid state and after filtration the surplus of water may be removed by the vacuum process, until the gum is brought to the desired viscosity.

A good part of the gum itself is a lime compound similar to the lime compound found in gum arabic and is an actual chemical combination.

The advantages of this method will be the production of a light colored gum, immediately upon its solution, due to the cooking in the acid medium and the advantages of producing a light colored gum are fully set forth above, to which might be added the brilliancy and transparency and the fact that the addition of the color pigment to the gum does not darken the pigment but retains it in its original colorings which is exceedingly important in printing on delicate fabrics and particularly when printing with delicate or pastel shades.

Having carefully and fully described my invention, what I claim and desire to obtain by Letters Patent is:

The preparation of Shiraz or Karaya gum for printing on fabric which consists of cooking the gum in an acid medium, neutralizing a portion of the acid, precipitating the impurities and metallic salts and filtering the gum.

PHILIP KAPLAN.